(12) United States Patent
Bauer et al.

(10) Patent No.: US 11,291,975 B2
(45) Date of Patent: Apr. 5, 2022

(54) CATALYTIC CONVERTER

(71) Applicant: Johnson Matthey Catalysts (Germany) GmbH, Redwitz (DE)

(72) Inventors: Juergen Bauer, Redwitz (DE); Ralf Dotzel, Redwitz (DE); Joerg Walter Jodlauk, Redwitz (DE); Rainer Leppelt, Redwitz (DE); Joerg Werner Muench, Redwitz (DE)

(73) Assignee: Johnson Matthey Public Limited Company, London (GB)

( * ) Notice: Subject to any disclaimer, the term of this patent is extended or adjusted under 35 U.S.C. 154(b) by 215 days.

(21) Appl. No.: 16/416,640

(22) Filed: May 20, 2019

(65) Prior Publication Data
US 2019/0270070 A1 Sep. 5, 2019

Related U.S. Application Data

(63) Continuation of application No. 15/113,279, filed as application No. PCT/GB2015/050149 on Jan. 23, 2015, now Pat. No. 10,300,461.

(30) Foreign Application Priority Data

Jan. 23, 2014 (DE) .......................... 102014201263.5

(51) Int. Cl.
*B01J 23/30* (2006.01)
*B01J 23/847* (2006.01)
(Continued)

(52) U.S. Cl.
CPC .......... *B01J 23/30* (2013.01); *B01D 53/9418* (2013.01); *B01J 21/08* (2013.01); *B01J 21/16* (2013.01);
(Continued)

(58) Field of Classification Search
None
See application file for complete search history.

(56) References Cited

U.S. PATENT DOCUMENTS 4,085,193 A 4/1978 Nakajima et al.
4,663,300 A 5/1987 Lester et al.
(Continued)

FOREIGN PATENT DOCUMENTS

CN 101422728 A 5/2009
CN 101674885 A 3/2010
(Continued)

OTHER PUBLICATIONS

Anderson, "Structure of Metallic Catalysts" Translation from English of Candidate of Chemical Sciences, E.E. Rachkovsky, Publishing House "Mir", Moscow 1978, 2 Pages (English Translation).
(Continued)

*Primary Examiner* — Colin W. Slifka

(57) ABSTRACT

In order to specify a catalytic converter, especially SCR catalytic converter, with maximum catalytic activity, this catalytic converter has at least one catalytically active component and additionally at least one porous inorganic filler component having meso- or macroporosity. The organic porous filler component has a proportion of about 5 to 50% by weight. More particularly, a diatomaceous earth or a pillared clay material is used as the porous inorganic filler component.

18 Claims, 1 Drawing Sheet

(51) Int. Cl.

| | | |
|---|---|---|
| B01J 23/22 | (2006.01) | |
| B01D 53/94 | (2006.01) | |
| B01J 29/00 | (2006.01) | |
| B01J 29/04 | (2006.01) | |
| B01J 29/08 | (2006.01) | |
| B01J 29/16 | (2006.01) | |
| B01J 29/40 | (2006.01) | |
| B01J 29/48 | (2006.01) | |
| B01J 29/70 | (2006.01) | |
| B01J 29/78 | (2006.01) | |
| B01J 29/83 | (2006.01) | |
| B01J 29/85 | (2006.01) | |
| B01J 35/04 | (2006.01) | |
| B01J 37/00 | (2006.01) | |
| C04B 38/08 | (2006.01) | |
| B01J 21/08 | (2006.01) | |
| B01J 21/16 | (2006.01) | |
| B01J 29/06 | (2006.01) | |
| B01J 35/06 | (2006.01) | |
| C04B 111/00 | (2006.01) | |

(52) U.S. Cl.
CPC ............ *B01J 23/22* (2013.01); *B01J 23/8472* (2013.01); *B01J 29/005* (2013.01); *B01J 29/049* (2013.01); *B01J 29/06* (2013.01); *B01J 29/084* (2013.01); *B01J 29/166* (2013.01); *B01J 29/40* (2013.01); *B01J 29/48* (2013.01); *B01J 29/70* (2013.01); *B01J 29/7007* (2013.01); *B01J 29/7015* (2013.01); *B01J 29/78* (2013.01); *B01J 29/783* (2013.01); *B01J 29/7815* (2013.01); *B01J 29/83* (2013.01); *B01J 29/85* (2013.01); *B01J 35/04* (2013.01); *B01J 35/06* (2013.01); *B01J 37/0009* (2013.01); *C04B 38/08* (2013.01); *B01D 2255/2065* (2013.01); *B01D 2255/2092* (2013.01); *B01D 2255/20707* (2013.01); *B01D 2255/20723* (2013.01); *B01D 2255/20776* (2013.01); *B01D 2255/30* (2013.01); *B01D 2255/50* (2013.01); *B01D 2255/9155* (2013.01); *B01J 2229/186* (2013.01); *B01J 2229/42* (2013.01); *C04B 2111/0081* (2013.01)

(56) References Cited

U.S. PATENT DOCUMENTS

| | | | |
|---|---|---|---|
| 4,973,570 | A | 11/1990 | Ukawa et al. |
| 6,521,559 | B1 | 2/2003 | Long et al. |
| 8,263,032 | B2 | 9/2012 | Andersen et al. |
| 8,367,578 | B2 | 2/2013 | Collier et al. |
| 8,609,047 | B2 | 12/2013 | Dotzel et al. |
| 8,815,190 | B2 | 8/2014 | Dotzel et al. |
| 9,040,003 | B2 | 5/2015 | Andersen et al. |
| 9,138,731 | B2 | 9/2015 | Chandler et al. |
| 9,364,792 | B2 | 6/2016 | Mori et al. |

| | | | |
|---|---|---|---|
| 2003/0073566 | A1 | 4/2003 | Marshall et al. |
| 2004/0152586 | A1 | 8/2004 | Ou et al. |
| 2005/0085383 | A1* | 4/2005 | Hoj .................... B01J 23/30 502/412 |
| 2007/0077189 | A1 | 4/2007 | Hubig et al. |
| 2010/0111793 | A1 | 5/2010 | Mori et al. |
| 2012/0308439 | A1 | 12/2012 | Chen et al. |
| 2013/0089481 | A1* | 4/2013 | Sumiya ................. B01J 37/038 423/213.5 |

FOREIGN PATENT DOCUMENTS

| | | | |
|---|---|---|---|
| CN | 101954290 | A | 1/2011 |
| CN | 102114424 | A | 7/2011 |
| CN | 103191718 | A | 7/2013 |
| CN | 103252230 | A | 8/2013 |
| DE | 3531871 | A1 | 3/1986 |
| DE | 102004030302 | A1 | 1/2006 |
| DE | 102011010106 | A1 | 8/2011 |
| DE | 102012213639 | A1 | 2/2013 |
| JP | S6164334 | A | 4/1986 |
| JP | H01254250 | A | 10/1989 |
| JP | H08117597 | A | 5/1996 |
| JP | 2001300309 | A | 10/2001 |
| JP | 2005021780 | A | 1/2005 |
| JP | 2007529300 | A | 10/2007 |
| JP | 2009206393 | A | 9/2009 |
| JP | 2013521996 | A | 6/2013 |
| JP | 2014525833 | A | 10/2014 |
| RU | 2061543 | C1 | 6/1996 |
| WO | 2009001131 | A1 | 12/2008 |
| WO | 2011092517 | A1 | 8/2011 |
| WO | 2011092519 | A1 | 8/2011 |
| WO | 2011092521 | A1 | 8/2011 |
| WO | 2012166868 | A1 | 12/2012 |
| WO | 2013017873 | A1 | 2/2013 |
| WO | 2013147465 | A1 | 10/2013 |
| WO | 2013182255 | A1 | 12/2013 |
| WO | 2015036748 | A1 | 3/2015 |

OTHER PUBLICATIONS

Lachman et al., "Extruded Monolithic Catalyst Supports", Catalysis Today, 14 (1992), pp. 317-329.

Mohino et al., "PILC-Based Monolithic Catalysts for the Selective Catalytic Reduction of Nitrogen Oxides by Methane in Oxygen Excess", Catalysis Today 107-108 (2005) pp. 192-199.

Van Garderen, et al., "Investigation of Clay Content and Sintering Temperature on Attrition Resistance of Highly Porous Diatomite Based Material", Applied Clay Science 52, (2011) pp. 115-121.

Datsko, et al., "Physicochemical and Adsorption-Structural Properties of Diatomite Modified with Aluminum Compounds", Institute of Applied Physics, Academy of Sciences of Moldova, ul. Academiei 5, Kishinev, MD 2028 Republic of Moldova (2011) 23 Pages.

Yan, Weipingl: Clean Coal Power Generation Technology, p. 71, China Electric Power Press, published on Feb. 28, 2002.

Zhao, Hang, et al: Post-treatment Technology for Automotive Diesel Engine, p. 99, Popular Science Press, published on Nov. 30, 2010.

* cited by examiner

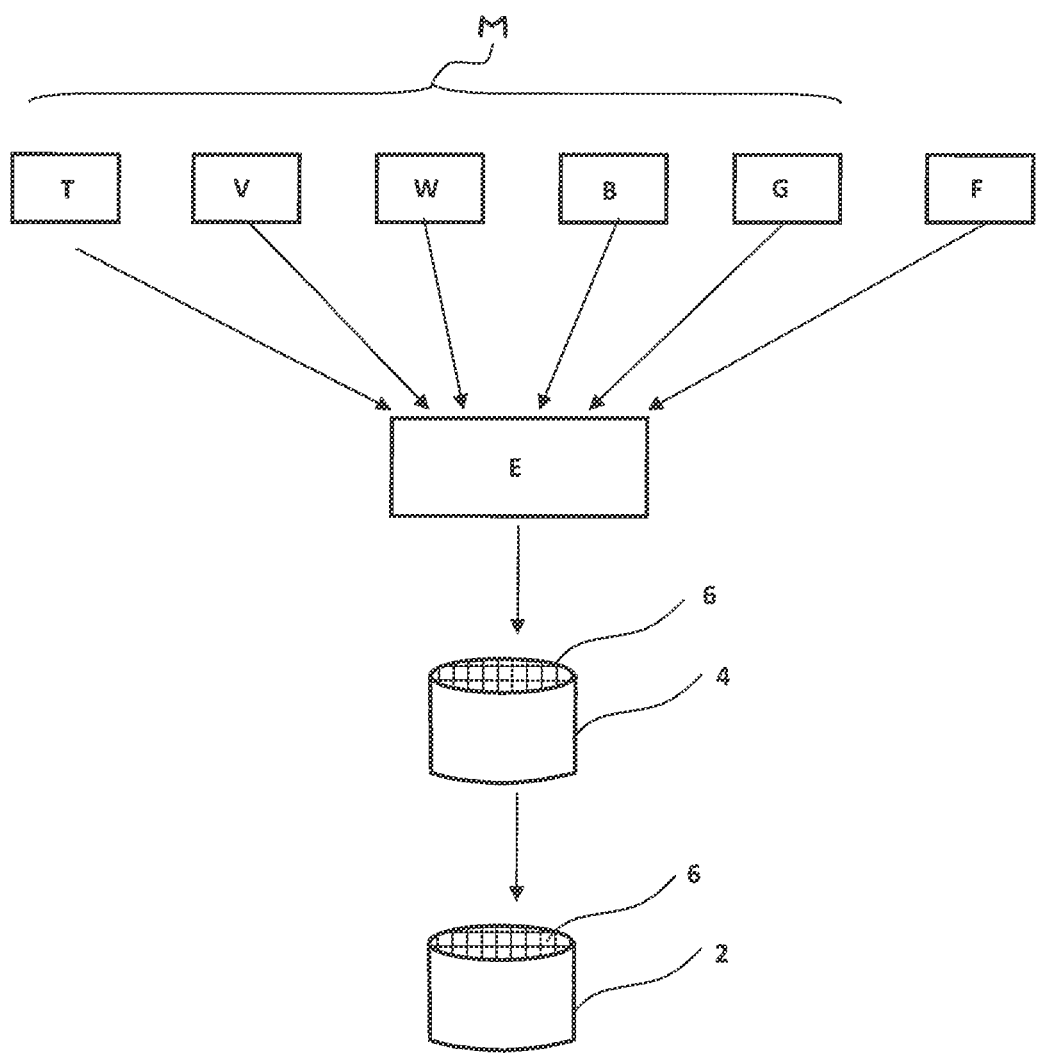

CATALYTIC CONVERTER

CROSS REFERENCE TO RELATED APPLICATIONS

This application is a Continuation of U.S. patent application Ser. No. 15/113,279, filed on Jul. 21, 2016, which issued as U.S. Pat. No. 10,300,461 on May 28, 2019, and is the National Phase Application of PCT International Application No. PCT/GB2015/050149, filed Jan. 23, 2015, and claims priority of German Patent Application No. 102014201263.5, filed Jan. 23, 2014, the disclosures of both of which are incorporated herein by reference in their entireties for all purposes.

FIELD OF THE INVENTION

The invention relates to a catalytic converter, especially an SCR catalytic converter.

BACKGROUND

Reduction in nitrogen oxide levels in exhaust gases both from stationary and from mobile combustion systems, especially in motor vehicles, is accomplished using the known method of selective catalytic reduction (SCR). This involves reducing nitrogen oxides in the presence of ammonia and oxygen to nitrogen. Various catalytic converter types and systems are known in principle for the acceleration of this reaction. An established class of catalytic converter is based on a titanium-vanadium catalytic converter system. Titanium-vanadium catalytic converters of this kind are used both in stationary systems and in mobile combustion systems. A further class of catalytic converter which has recently been at the focus of attention, especially for mobile use in motor vehicles, is that of zeolite-based catalytic converters. These catalytically active components include, more particularly, what are called iron- or copper-exchanged zeolites, preferably of the ZSM-5 (MFI), beta (BEA) or chabazite (CHA) type.

The catalytic converters used nowadays in motor vehicles are predominantly ceramic honeycomb catalytic converters. In operation, the exhaust gas to be cleaned flows through channels in the catalytic converter which has been extruded, for example.

A basic distinction is drawn here between what are called all-active extrudates and coated supports, known as "washcoats". In the all-active extrudates, a catalytically active catalyst material forms the extruded body, meaning that the channel walls of the catalytic converter are formed completely from a catalytically active material. In the washcoats, a catalytically inert, extruded support body is coated with the actual catalytically active catalyst material. This is effected, for example, by dipping the extruded support body into a suspension comprising the catalyst material.

In principle, the aim is a maximum catalytic activity in the catalytic converters, i.e. a maximum NOx conversion.

A crucial factor for a maximum NOx conversion is very good contact between the offgas to be cleaned and the catalytically active material. The catalytic conversion proceeds to a crucial degree in the near-surface region at the walls of the respective flow channel through which the exhaust gas flows. Especially in the case of all-active extrudate honeycomb catalysts in which the entire extruded body is comprised of catalytically active material, the effect of this is that comparatively large volume regions of the catalyst material remain unutilized for the NOx conversion.

In the light of this, it is an object of the invention to specify a catalytic converter, especially an SCR catalytic converter, with improved catalytic activity.

BRIEF DESCRIPTION OF THE DRAWINGS

FIG. 1 is a schematic diagram showing the components of the catalytic converter.

DETAILED DESCRIPTION OF THE INVENTION

The object is achieved in accordance with the invention by a catalytic converter, especially SCR catalytic converter, having at least one catalytically active component and additionally having at least one porous inorganic filler component which has at least mesoporosity or else macroporosity. Mesoporosity is understood to mean pores having a pore size of at least 2 to not more than 50 nm, and macroporosity to mean pores having a pore size greater than 50 nm (IUPAC definition).

"At least mesoporosity" is therefore generally understood to mean that the filler component has a porosity having pores larger than 2 nm. This filler component, more particularly, at least also includes or else has exclusively micropores, and is therefore microporous. In addition, the filler component may also have macropores. Finally, the filler component may also have exclusively pores having a size greater than 50 nm, i.e. not exhibit any microporosity.

The filler component is a material which is pulverulent in the initial state and comprises particles having a particle size in the range from a few micrometres to a few tens of micrometres, for example in the range from 1 µm to 100 µm. The particles themselves are porous.

The addition of a porous filler component of this kind achieves the particular effect that the comparatively large pores—compared, for example, to zeolites having only microporosity with pores of not more than 1 nm—result in improved diffusion of the exhaust gas to be cleaned within the volume of the catalytic converter too. Overall, this achieves better exploitation of the catalyst material, and lower-lying layers of the catalyst material too contribute effectively to the catalytic action, especially to NOx reduction.

Overall, a high catalytic activity of the catalytic converter is surprisingly achieved, even though the additional filler component reduces the proportion by weight of the catalytically active component. A specific catalytic activity based on the proportion of the catalytically active component is therefore improved by the porous filler component.

An additional factor of particular significance is that the filler component is an inorganic filler component which remains even in the final ceramic catalytic converter after the sintering operation, and hence also makes a crucial contribution to the mechanical stability of the catalytic converter. In contrast, organic extrusion aids are volatilized during the sintering operation and can also create a certain level of porosity as a result. Overall, the addition of a porous inorganic filler component of this kind achieves improved catalytic activity with equal or even improved mechanical stability of the catalytic converter. This is of particular significance especially in the case of all-active extrudates.

The catalytic converter typically consists generally of a plurality of base components and the porous filler component. The catalytically active component here is one of the base components. As well as this catalytically active component, particularly a binder component and optionally fibres for mechanical stability are also used as base components. The base components are present in a defined ratio of proportions relative to one another. In an appropriate configuration, the catalytic converter with the porous filler component has at least a comparable and especially an equal or even better catalytic activity per unit catalytic converter volume compared to a comparative catalytic converter containing only the base components in the same ratio of proportions as the catalytic converter with the porous filler component.

Given the same total weight of the catalytic converter with the porous filler component and the comparative catalytic converter, the two catalytic converters therefore have at least comparable catalytic activity. The catalytic activity per unit catalyst material used is therefore improved by the porous filler component. This applies at least to a temperature range from, for example, about 400° C., in which the catalytic converter for the NOx conversion is typically operated in a motor vehicle. The same catalytic activity is therefore achieved with a lower proportion of the catalytically active component. Therefore, less catalytically active material is required for the same catalytic activity. This leads to distinct cost savings. The addition of the porous filler material also reduces the specific weight of the catalytic converter.

The proportion of this porous filler component is preferably within the range from 5 to 50% by weight and especially in the range from 10 to 25% by weight, based in each case on the total mass of the final catalytic converter. Therefore, a considerable proportion by mass is replaced by the porous filler component. It is possible here to use a plurality of different porous filler components. The total proportion thereof is within the stated weight ranges from 5 to 50% by weight and especially from 10 to 25% by weight.

In a preferred configuration, the at least one porous filler component is a clay material. It is appropriate here to use a pillared clay material (PILC). This clay material generally has two-dimensional clay layers spaced apart by inorganic pillars. The pillars consist, for example, of titanium oxide or aluminium oxide.

In an alternative configuration, the at least one porous inorganic filler component is a diatomaceous earth. The latter ensures a high porosity. Studies have shown that the use of a diatomaceous earth as a filler material achieves particularly effective exploitation of the remaining catalyst material and of the catalytically active components.

For the catalytic converters used, different catalytic converter systems are known in principle. Catalytic converter systems are understood here to mean the component systems partly responsible for the catalytic activity.

In a first preferred group, the catalytic converter includes a catalytic, non-zeolitic system based on a base metal.

In a first execution variant, the catalytic converter here is a catalytic converter based on titanium-vanadium with vanadium as the catalytically active component.

Overall, in various execution variants, different titanium-vanadium systems are used. More particularly, oxidic systems comprising mixtures of titanium dioxide ($TiO_2$) and vanadium pentoxide ($V_2O_5$) are used. Alternatively, the titanium-vanadium system comprises vanadium-iron compounds as the catalytically active component, including especially iron vanadate ($FeVO_4$) and/or iron aluminium vanadate ($Fe_{0.8}Al_{0.2}VO_4$).

In the case of the oxidic systems, these are especially titanium-vanadium-tungsten systems, titanium-vanadium-tungsten-silicon systems, titanium-vanadium-silicon systems. In the case of the second group comprising vanadium-iron compounds, these are titanium-vanadium-tungsten-iron systems, titanium-vanadium-tungsten-silicon-iron systems or titanium-vanadium-silicon-iron systems.

The titanium/vanadium weight ratio (Ti/V) is appropriately in the range between 35 and 90. In the case of oxidic titanium-vanadium systems, the weight ratio between titanium dioxide and vanadium pentoxide ($TiO_2/V_2O_5$) is typically in the range from 20 to 60.

The titanium-vanadium system typically has a proportion by weight of 70 to 90% by weight, based on the final catalytic converter. The remaining 10 to 30% by weight is divided between the porous inorganic filler component and binder components, and possibly fibre components.

In a second variant of the catalytic system based on a base metal, a tungsten oxide-cerium oxide system or a stabilized tungsten oxide-cerium oxide system ($WO_3/CeO_2$) is used for the catalytic system.

The stabilized tungsten/cerium system is especially a zirconium-stabilized system comprising Ce-zirconium mixed oxides. Preferably, a transition metal, especially iron, is distributed within such a support material. The transition metals used are especially selected from the group consisting of Cr, Ce, Mn, Fe, Co, Ni, W and Cu and especially selected from the group consisting of Fe, W, Ce and Cu.

The catalytic system is especially an Fe—W/$CeO_2$ or Fe—W/$CeZrO_2$ system, as described particularly in connection with FIG. 3 of WO 2009/001131, which is referenced here in full. The proportion of the transition metal in the catalytic converter is preferably in the range from 0.5 to 20% by weight based on the total weight of the catalytic converter.

As an alternative to non-zeolitic catalytic systems of this kind, the at least one catalytically active component is preferably a crystalline molecular sieve. "Crystalline molecular sieve" is understood here to mean particularly zeolites in the narrower sense, namely crystalline aluminosilicates. Furthermore, crystalline molecular sieves are also understood to mean further molecular sieves which are not aluminosilicates but have a zeolitic framework structure, as apparent from the zeolite atlas of the Structure Commission of the International Zeolite Association, IZA-Sc. More particularly, this relates to silicoaluminophosphates (SAPO) or else aluminophosphates (ALPO), which are likewise included in the zeolite atlas mentioned.

Catalytically active components used in this context are especially molecular sieves having the CHA framework structure, especially chabazite, AEI, especially ALPO 18, ERI, MFI, BEA, FAU, AFX or FER (the nomenclature used here refers back to the nomenclature used in the zeolite atlas).

In the case of the crystalline molecular sieves having the framework structures according to the zeolite atlas, a distinction is generally made between small-pore, medium-pore and large-pore crystalline molecular sieves. Small-pore molecular sieves are those sieves having a maximum pore opening with a ring structure composed of eight tetrahedral atom structures. Medium-pore and large-pore molecular sieves, finally, are understood to mean those in which the maximum pore openings are formed by a ring opening having a ring of not more than 10 (medium-pore) or of not more than 12 (large-pore) atom structures in tetrahedral arrangement. The BEA framework structure mentioned is a large-pore framework structure, MFI is a medium-pore structure and CHA is a small-pore structure. The FAU framework structure mentioned is likewise a large-pore structure, preferably a Y zeolite. AEI is a small-pore framework structure, and preference is given here to using a zeolite with the SSZ-39 designation. FER is a medium-pore framework structure, and the material used is preferably ferrierite or ZSM-35. ERI is a small-pore structure, and the material used is preferably erionite. AFX is a small-pore framework structure, and the material used is preferably SSZ-16. The BEA, MFI and FAU framework structures (here especially zeolite Y) are preferably used as hydrocarbon traps. All the framework structures and materials mentioned can be used as SCR catalytic converters; they are suitably activated by a metal, especially ion-exchanged with copper and/or iron and/or cerium, preferably activated with copper or iron.

Appropriately, the molecular sieve generally comprises a metallic activator (promoter). This is especially copper, iron or cerium or a mixture thereof. More particularly, the molecular sieve is a molecular sieve, especially zeolite, exchanged with metal ions of this kind. As an alternative to the ion-exchanged molecular sieve in which the metal ions are thus incorporated into the framework structure, it is also possible that these metal activators are not incorporated in the framework structure and are thus present effectively as "free" metals or metal compounds (e.g. metal oxides) in the individual channels of the molecular sieves, for example as a result of impregnation of the molecular sieve with a solution containing the compound. Another possibility is a combination of ion-exchanged metals and free metal compounds in the molecular sieve.

The different catalytic systems described here are used either selectively or else in combination. More particularly, a mixture of the system based on titanium-vanadium with crystalline molecular sieves is used. A mixed catalytic converter of this kind comprises, as the first component, especially an aluminosilicate or iron silicate molecular sieve, which is either in the so-called H+ form or has been ion-exchanged with one or more transition metals, especially with iron. The second component is a vanadium oxide on a metal oxide support selected from aluminium, titanium, zirconium, cerium, silicon or combinations thereof. More particularly, the support material for the second component is titanium oxide. The first component is especially an iron-exchanged MFI, BEA or FER aluminosilicate molecular sieve (zeolite). The ratio of the first component to the second component in this mixture is in the range from 5:95 to about 40:60.

In contrast to the catalytically active component, the porous filler is preferably catalytically inactive, and therefore serves purely as a porous filler material.

As already mentioned, the catalytic converter further comprises, in addition to the porous filler component, a binder component, supplemented, in an appropriate configuration, also by a fibre component in the case of an extrusion material. The proportion of the binder component and of the fibres is preferably in the region of a few % by weight in each case, for example in the range from 4 to 10% by weight.

The catalytic converter is especially an extruded catalytic converter, preferably a honeycomb catalytic converter. In one execution variant, the catalytic converter body has been coated with a catalytically active coating which is either identical to or different from the extruded body. A coating of this kind has been applied, for example, as a washcoat, as disclosed by DE 10 2012 213 639 A1. More particularly, the catalytic converter is an extruded SCR honeycomb catalytic converter. In an alternative embodiment, no coating has been applied.

In a preferred configuration, the extruded catalytic converter, especially the extruded honeycomb catalytic converter, takes the form of what is called a wall-flow filter, in which the exhaust gas flows through porous walls in operation. In contrast, a through-flow filter (which likewise frequently takes the form of a ceramic honeycomb catalytic converter) is permeated in longitudinal direction by flow channels for the exhaust gas. The development of the wall-flow filter is accomplished through a suitable adjustment of the porosity. A wall-flow filter of this kind is described, for example, in DE 10 2011 010 106 A1.

The catalytic converter preferably takes the form of an SCR catalytic converter, i.e. has catalytic activity for the desired deNOx reaction.

However, the concept described here involving the introduction of the inorganic filter component with at least mesoporosity is not confined to the use for SCR catalytic converters.

This concept is suitable in principle for all kinds of catalytic converters for improving catalytic activity.

More particularly, the catalytic converter is, for example, what is called a hydrocarbon trap, especially without additional catalytic coating. Catalysts of this kind are also referred to as cold-start catalytic converters, since they control the HC content in the exhaust gas because of their ability to store hydrocarbons during the start phase of an internal combustion engine. A cold-start catalytic converter of this kind is described, for example, in WO 2012/166868 A1. A catalytic converter of this kind takes the form, more particularly, of an extruded honeycomb catalytic converter with a crystalline molecular sieve, especially also of a mixture of such a molecular sieve with a noble metal, especially palladium (Pd) for example. This noble metal can also be added to the zeolite together with a base metal. Studies show that palladium-impregnated crystalline molecular sieves, especially without iron, likewise exhibit the desired properties of a cold-start catalytic converter. Cold-start catalytic converters of this kind show, for example, good $NO_x$ storage and conversion capacity with high selectivity for $N_2$ at relatively low temperatures, good storage capacity and conversion of hydrocarbon at low temperatures, and improved carbon monoxide oxidation activity.

As an alternative to these preferably uncoated extruded catalytic converters, in the form of hydrocarbon traps, the catalytic converter takes the form of a coated, extruded honeycomb catalytic converter with the propensity to act as a hydrocarbon trap. This catalytic converter preferably again includes crystalline molecular sieves, preferably, for example, in the H+ form and especially in "unmetallized" form, i.e. without metallic activators. As an alternative, the crystalline molecular sieves comprise palladium and/or silver. In this execution variant, extruded honeycombs of this kind have been provided with a catalytically active coating, especially for formation of a diesel oxidation catalytic converter or of a three-way catalytic converter, or have been converted to a wall-flow filter which is subsequently coated with an oxidation catalytic converter, in order to convert it—in a similar manner to a diesel oxidation catalytic converter—to what is called a catalysed soot filter (CSF). One example of a three-way catalytic converter is disclosed by WO 2011/092517 A1, and an example of an extruded diesel oxidation catalytic converter and of an extruded catalysed soot filter is disclosed, for example, by WO 2011/092519.

The appended FIGURE illustrates, by way of example, a process for producing an extruded honeycomb catalytic converter of this kind.

For production of the extruded honeycomb catalytic converter 2, an extrudable catalyst material F is generally first provided, in which the individual components, i.e. the base components M and the filler component F, are typically provided as a pulverulent starting material, mixed with one another and processed to give the pasty catalyst material E. By an extrusion operation, an extruded shaped body 4 having flow channels 6 is subsequently produced and, after a drying operation, is sintered to form the finished ceramic honeycomb catalytic converter.

In principle, the catalytic converter 2, however, is not confined to extruded all-active extrudate honeycomb catalytic converters of this kind. Alternatively, the catalytically active catalyst material E has been applied, for example, as a coating on a support material. The catalytic converter 2 therefore alternatively takes the form, for example, of a washcoat or else of a plate catalytic converter or else of extruded pellets. It is particularly advantageous to use the porous filler component F in extruded all-active catalytic converters, since particularly efficient exploitation of the catalyst material in deeper catalyst layers too is achieved particularly in these cases.

The catalytic converter, which preferably takes the form of an all-active extrudate, in a first execution variant, includes, as base components M, titanium dioxide at about 60 to 80% by weight, vanadium pentoxide at about 1 to 2.5% by weight, tungsten trioxide at about 4 to 14% by weight, a clay mineral suitable as a binder component at about 4 to 10% by weight, and also, if required, fibres, especially glass fibres, to improve the mechanical stability, for example in the range from 4 to 10% by weight. These base components are designated in FIG. 1 by the abbreviations T, V, W, B, G.

In addition, the porous inorganic filler component F is also added at about 4 to 20% by weight.

As the porous filler component F, a diatomaceous earth in particular is used. As fibres, inorganic glass fibres G, for example having a fibre diameter of 6 μm, are used. The catalytic converter 2 especially has compositions according to the following table, Table 1:

| | Component | Comparative cat. % by wt. | Cat 1 % by wt. | Cat 2 % by wt. |
|---|---|---|---|---|
| A | $V_2O_5/TiO_2/WO_3$ | 78.3 | 75.7 | 73.7 |
| B | clay | 12.5 | 10 | 8 |
| G | glass fibres | 9.2 | 6.7 | 4.7 |
| F | diatomaceous earth (DE) | 0 | 7.6 | 13.6 |

The table compares a comparative catalytic converter without porous filler component F with two catalytic converters Cat 1 and Cat 2 having a filler component F with a proportion of 7.6% by weight and with 13.6% by weight.

The base components M are formed by the components A, B, G, where A identifies the catalytically active system, in the present case an oxidic titanium-vanadium-tungsten system. The ratio of proportions of the base components relative to one another is the same in all cases. The active system itself, in the case of the comparative catalytic converter, has a composition of about 65-70% by weight of $TiO_2$, about 8-11% by weight of $WO_3$ and about 1-3% by weight of $V_2O_5$, based on the overall composition.

The extruded catalytic converters Cat 1 and Cat 2 produced in this way and having the compositions specified were compared in terms of catalytic activity with the comparative catalytic converter having the same composition of the base components M in terms of proportions as the catalytic converter according to the table, apart from the inorganic filler component F.

What was measured here was the NOx conversion under identical experimental conditions as a function of temperature. Thus, a constant exhaust gas mass flow rate was conducted through the catalytic converter 2 and through the comparative catalytic converter for a given flow rate and defined exhaust gas composition. The nitrogen oxide content was measured upstream and downstream of the catalytic converter 2 and this was used to find the conversion. The result is shown in Table 2 below.

This table reports the measured $NO_X$ conversion per unit honeycomb volume (catalytic converter volume) ($X_{NOx}/V$) and per unit honeycomb mass (catalytic converter mass) ($X_{NOx}/M$) at various temperatures (under the experimental conditions: honeycomb catalytic converter with 400 cpsi (cells per square inch); $NO_x=NH_3=100$ ppm ($NO_2=0$ ppm); $H_2O=7\%$; $O_2=9.3\%$; SV (space velocity)=60 000 $h^{-1}$)

| | DE content [%] | $X_{NOx}/V$ 250° C. [%/ml] | $X_{NOx}/V$ 400° C. [%/ml] | $X_{NOx}/V$ 500° C. [%/ml] | $X_{NOx}/M$ 250° C. [%/g] | $X_{NOx}/M$ 400° C. [%/g] | $X_{NOx}/M$ 500° C. [%/g] |
|---|---|---|---|---|---|---|---|
| Comparative | 0 | 1.09 | 1.35 | 1.16 | 1.70 | 2.11 | 1.80 |
| Cat 1 | 7.6 | 1.07 | 1.37 | 1.17 | 1.81 | 2.31 | 1.97 |
| % increase | | −2 | 1.5 | 0.6 | 6.5 | 9.5 | 9.5 |
| Cat 2 | 13.6 | 1.06 | 1.37 | 1.21 | 1.87 | 2.43 | 2.15 |
| % increase | | −2.7 | 1.5 | 3.1 | 10 | 15.2 | 19.4 |

As can be seen, the catalytic converters Cat 1 and Cat 2, within a temperature range relevant for normal catalytic converter operation, each have a much higher NOx conversion based on the catalytic converter mass than the comparative catalytic converter, whereas only a slight improvement is apparent based on the catalytic converter volume. In the optimal case, a 20% improvement in conversion rate based on the catalytic converter mass was achieved (Cat 2, 500° C.).

The invention claimed is:

1. A catalytic converter comprising:
   (a) a base component comprising an oxide of titanium and at least one catalytically active component comprising an oxide of vanadium, a clay binder and optionally fibres that provide mechanical stability; and
   (b) at least one porous inorganic filler comprising a diatomaceous earth having at least mesoporosity.

2. The catalytic converter of claim 1, wherein at least one catalytically active component is an SCR catalyst.

3. The catalytic converter of claim 1, wherein:
   the base component, the at least one catalytically active component, the clay binder, and the fibers, if present, are present in a defined ratio of proportions by weight relative to one another, and the catalytic converter has at least a same catalytic activity as a comparative catalytic converter without the diatomaceous earth and with the same base component, the catalytically active component, the clay binder, and the fibers, if present, having same defined ratio of proportions relative to one another.

4. The catalytic converter of claim 1, wherein the diatomaceous earth is present within the range from 5 to 50% by weight relative to the total weight of the catalytic converter.

5. The catalytic converter of claim 4, wherein the diatomaceous earth is present within the range from 10 to 25% by weight, relative to the weight of the catalytic converter.

6. The catalytic converter of claim 1, wherein the base component further comprises $WO_3$.

7. The catalytic converter of claim 1, further comprising a molecular sieve.

8. The catalytic converter of claim 7, wherein the molecular sieve is an aluminosilicate zeolite.

9. The catalytic converter of claim 7, wherein the molecular sieve has a MFI, BEA, CHA, AEI, FAU, AFX or ERI framework structure.

10. The catalytic converter of claim 7, wherein the molecular sieve comprises a metallic activator.

11. The catalytic converter of claim 7, wherein the molecular sieve comprises an ion-exchanged zeolite.

12. The catalytic converter of claim 1 that is in a form of an extruded catalytic converter.

13. The catalytic converter of claim 12 that is a honeycomb catalytic converter.

14. The catalytic converter of claim 1 that is in a form of a wall-flow filter.

15. The catalytic converter of claim 1, comprising $TiO_2$ and $V_2O_5$ present in a weight ratio of from 20 to 60.

16. The catalytic converter of claim 1, wherein the base component comprises an oxidic titanium-vanadium-tungsten catalytic system.

17. The catalytic converter of claim 1, comprising an extruded composition of:
 (a) titanium dioxide, present in a range of from 60 to 80 wt %;
 (b) vanadium pentoxide, present in a range of from 1 to 2.5 wt %;
 (c) tungsten trioxide, present in a range of from 4 to 14 wt %;
 (d) an aluminosilicate clay binder, present in a range of from 4 to 10 wt %;
 (e) diatomaceous earth, present in a range of from 4 to 20 wt %; and optionally
 (f) glass fibers, which when present are present in a range of from 4 to 10 wt %;
wherein the weight percentages in each case are with respect to the weight of the entire extruded composition.

18. The catalytic converter of claim 1, wherein the base component comprises an oxidic titanium-vanadium-iron catalytic system.

* * * * *